United States Patent [19]

Tucker

[11] Patent Number: 5,162,154

[45] Date of Patent: Nov. 10, 1992

[54] FILMS FOR PACKAGED ARTICLES ELIMINATING AIR ENTRAPMENT

[75] Inventor: John H. Tucker, Beaumont, Tex.

[73] Assignee: E. I. Du Pont de Nemours and Company, Wilmington, Del.

[21] Appl. No.: 374,707

[22] Filed: Jul. 3, 1989

[51] Int. Cl.$^5$ .............................................. D02G 3/00
[52] U.S. Cl. .................................... 428/402; 428/516; 428/518; 428/520; 53/509; 53/427
[58] Field of Search ............... 428/516, 518, 520, 402, 428/401; 53/509, 427

[56] References Cited

U.S. PATENT DOCUMENTS

| | | | |
|---|---|---|---|
| 877,007 | 8/1870 | Uhline | 260/32.6 |
| 3,371,464 | 3/1968 | Swick | 53/112 |
| 3,474,063 | 10/1969 | Powell | 260/30.8 |
| 3,595,827 | 7/1971 | Foster | 260/32.6 |
| 4,301,060 | 11/1981 | Underwood et al. | 260/42.49 |
| 4,389,450 | 6/1983 | Schaefer et al. | 428/212 |
| 4,454,281 | 6/1984 | Heitz et al. | 524/399 |
| 4,659,612 | 4/1987 | Balloni et al. | 428/213 |
| 4,663,383 | 5/1987 | Lowe et al. | 524/493 |
| 4,814,612 | 3/1989 | Yoshizaki et al. | 523/100 |
| 5,033,253 | 7/1991 | Havens et al. | 53/427 |

FOREIGN PATENT DOCUMENTS

| | | |
|---|---|---|
| 1133156 | 10/1985 | Canada . |
| 0124310 | 9/1985 | European Pat. Off. . |
| 48-090340 | 11/1973 | Japan . |
| 55060128 | 11/1973 | Japan . |
| 2206890A | 4/1977 | United Kingdom . |

*Primary Examiner*—Edith L. Buffalow

[57] ABSTRACT

Packages containing articles with smooth surfaces can be prepared without entrapment of air between the packaging film and the smooth surface of the articles by selecting a packaging film having at least one surface which comprises a polymer which in film form exhibits a specular gloss of at least about 20, measured at an angle of 20 degrees and a synthetic amorphous silica having particle size of about 0.5 to about 50 micrometers.

12 Claims, No Drawings

FILMS FOR PACKAGED ARTICLES ELIMINATING AIR ENTRAPMENT

BACKGROUND OF THE INVENTION

This invention relates to packaging films having special surface characteristics which eliminate air entrapment between the film and packaged articles having smooth surfaces.

Skin packaging is a special form of packaging that uses the product being packaged as a mold over which a heated plastic film is drawn by vacuum and then heat sealed to a backing. A frequent problem associated with this and similar types of packaging is the entrapment of pockets of unevacuated air between the film and the surface of the product. The entrapped air pockets create the illusion that there is water on the surface of the product; this "wet look" is especially severe when skin packaging a glossy surfaced item with a glossy film because together the two surfaces allow for entrapment of air pockets. The "wet look" detracts from the appearance and marketability of skin packaged products.

U.S. Pat. No. 3,595,827 discloses films of ethylene interpolymers, such as ethylene/acrylic acid ionomers. The slip and antiblocking properties of the films are improved by addition of 0.02 to 1.0% of an N-substituted fatty acid amide and about 0.01 to 2.0% of synthetic amorphous silica having an average particle size of about 0.5 to 8.0 microns. Comparative examples in which the synthetic amorphous silica is used alone exhibit at best an insignificant effect on the slip properties.

U.S. Pat. No. 3,474,063 discloses films of carbon chain-saturated polymers such as ionomers and additives such as N,N'-dialiphatic thiodipropionamides for improving the slip and block properties of such films. In addition, from 500 to 5000 p.p.m. of finely divided silica can be used to accelerate the effectiveness of the additive in highly glossy films. The silica may have, for examples, an average particle size of 4 microns.

U.S. Defensive Publication T877,077 discloses an ionic copolymer film having improved gloss and slip properties by addition of an oleamide and about 0.1% to about 0.5% of a siliceous material having an average particle size of about 0.1 to about 10 microns. The film is useful for packaging uses.

U.S. Pat. No. 4,389,450 discloses a multiple layer packaging film, one layer of which is a sealant. The sealant layer is e.g. a blend of EVA copolymer and ionomer, and contains a slip additive to control tackiness. A composition of 4% erucamide, 4% stearamide and 20% silica antiblock in an ethylene vinyl acetate base resin is disclosed as a prior art slip agent.

SUMMARY OF THE INVENTION

The present invention provides a package comprising:

(a) at least one article having a smooth surface, and (b) a substantially transparent film having at least one surface layer comprising (i) a polymer which in film form exhibits a specular gloss of at least about 20, measured at an angle of 20 degrees, and (ii) synthetic amorphous silica having particle size of about 0.5 to about 50 micrometers and being present in an amount sufficient to substantially prevent entrapment of air pockets between said surface layer of film and an adjacent smooth surface of said article, the silica-containing surface layer of said film being in contact with at least a part of the smooth surface of said article.

The present invention also provides a process for packaging an article with a smooth surface, comprising positioning the film as described above adjacent to the article with the silica-containing surface facing the article, bringing the film into contact with at least a portion of the smooth surface of the article, and securing the film in its contacting configuration.

The present invention further provides a film wherein a surface layer contains synthetic amorphous silica, as described above, suitable for contacting smooth surfaced articles in packages.

DETAILED DESCRIPTION OF THE INVENTION

The films and packages of the present invention are prepared using a specially filled thermoplastic film. The polymer used in the film is normally one which is both substantially transparent and glossy in film form, since in nontransparent or nonglossy films, the problem with "wet look" is not so apparent. The present invention is useful for films which exhibit a specular gloss of at least about 20, measured at an angle of 20 degrees, as measured according to ASTM d 2457-70, and increasingly useful as the specular gloss of the film increases to 80 or 100 or more.

Suitable films include those made from polyethylene, particularly low density polyethylene, and copolymers of ethylene. Such copolymers include ethylene-acid copolymers, such as copolymers with acrylic or methacrylic acid; neutralized ethylene acid copolymers or ionomers; ethylene ester copolymers such as ethylene vinyl acetate copolymer; and the like. Film-forming polymers as polyvinyl chloride and polyvinylidene chloride can also be used. The preferred polymers are copolymers of ethylene and methacrylic acid, most preferably those partially neutralized with sodium ion.

The filler used in the films of the present invention is a synthetic amorphous silica. Synthetic amorphous silica is a silica gel, which can be prepared e.g. by the hydrolysis of silicon compounds such as silicon tetrachloride. Synthetic amorphous silicas are available from commercial sources, as for example, those sold by Davison Chemical Division of W. R. Grace & Co. under the trade name "Syloid." "Syloid" is described as amorphous silicon dioxide, $SiO_2 \cdot xH_2O$, an aerogel form of silica gel. It is distinct from crystalline silica, such as quartz, and from naturally occuring amorphous silica, such as diatomaceous earth (which frequently contains crystalline forms). "Syloid" is more completely described in U.S. Pat. No. 3,595,827, the disclosure of which is incorporated herein by reference. Other forms of silica, such as diatomaceous earth or silica-alumina spheres, are not effective for the present invention. Ground glass powder of 15-20 micrometer size was found to be very difficult to handle and thus not suitable.

The synthetic amorphous silica should have a particle size of about 0.5 to about 50 micrometers, preferably about 3 to about 30 micrometers, and most preferably about 6 to about 15 micrometers. When the particles are too small the benefits of the invention are not realized, and if they are too large they may exceed the thickness of the film or otherwise result in protrusions or defects in the film surface.

The amount of silica to be added to the film is an amount sufficient to prevent entrapment of pockets of air between the surface of the film and an adjacent smooth surface of an article to be packaged. The exact amount required will depend on a number of factors, including the degree of smoothness of the surface of the article and the particle size of the synthetic amorphous silica, but in general amounts of about 0.5 to about 3 percent by weight are suitable. Amounts of about 0.75 to about 2.5 percent are preferred, and about 1 to about 2 percent is most preferred. When too little synthetic amorphous silica is used, the benefits of the present invention are not fully realized; if an excess is used the physical properties of the film, including transparency and strength may be degraded.

The synthetic amorphous silica can be distributed throughout the entire film, or it can be localized in one or two surface layers of a multilayer film, in which the surface layer will actually make contact with the articles to be packaged. If the silica is selectively placed in a surface layer the required amount of silica will be proportionally reduced, but the amount present in the surface layer will be as indicated above. Such multiple layer films generally have improved optical properties compared with films in which the silica is dispersed, at the same concentration, throughout the entire film.

The films of the present invention are made by blending the synthetic amorphous silica into the polymeric matrix. Such blending normally is accomplished by well-known melt blending techniques such as melt extrusion, dry blending, use of a Banbury TM mixer, etc. Blending can be done either directly or by means of a concentrate containing a higher level of silica in a carrier resin. Preferably the carrier resin is the same resin as the bulk of the film, although this is not essential. For example, use of low density polyethylene as a concentrate resin has given good results when blended into ionomer resin. Preferably the silica should be well-dispersed in the concentrate and also in the final film. The primary purpose of assuring that the silica is well dispersed is to assure a uniform appearance in the film itself; inadequate dispersion of the silica can result in silica-induced gel particles in the final film. Concentrates can be made by traditional processes such as mixing in a high intensity mixer such as a Banbury TM mixer, followed by extrusion into pellets.

Film formation can likewise be effected by well known methods such as blown film extrusion, flat extrusion, solvent casting, and the like. Formation of layered films in which a surface layer contains the synthetic amorphous silica can be accomplished by e.g. coextrusion techniques. Such layered films are useful because the amount of filler present in the total film can be minimized, thereby minimizing the reduction of optical properties which results from addition of filler.

On the other hand, single layer films are also quite suitable. U.S. Pat. No. 3,595,827 discloses single layer films which contain synthetic amorphous silica and an N-substituted fatty acid amide of the formula $R_1CONHR_2$, wherein $R_1$ is an ethylenically unsaturated hydrocarbon radical having from about 20 to 24 carbon atoms and $R_2$ is a saturated alkyl group having from about 14 to 26 carbon atoms. It is has been found that, even in the absence of such fatty acid amides, the present invention provides films which exhibit freedom from the "wet look." Therefore the present invention includes such films that are substantially free of fatty acid amides.

The film of this invention can be used to prepare packages which do not exhibit the "wet look." Such packages are preferably made using skin packaging techniques, although other types of packages are also benefitted from the use of the present invention. Skin packaging is a well-known packaging technique, described in more detail in U.S. Pat. No. 3,371,464, the disclosure of which is incorporated herein by reference. As used for this invention, skin packaging involves positioning an article to be packaged on a backing which is normally a porous material such as cardboard, although polymeric film can also be used. One or more such samples is inserted into a skin packaging machine on a vacuum platen. The plastic film of the present invention is placed onto the holding frame of the machine and is secured by the appropriate means. If only one surface of the film contains the synthetic amorphous silica, that side is placed facing the articles to be packaged. The film is heated, normally by placing a radiant heater within a few centimeters of the film for a few seconds. This heat treatment will heat the film to a temperature sufficient to cause it to soften and begin to sag or droop. When the film has heated sufficiently, the holding frame is lowered until the film drapes over the articles to be packaged and forms an air-tight seal over the vacuum platen. The heating is discontinued, and the air from above the vacuum platen and beneath the film is removed by use of a suitable vacuum pump. The vacuum pulls the film into close contact with the items to be packaged. Upon cooling the film maintains its shape and is held in conformity with the items. Thereafter the vacuum is released, the package is removed from the vacuum platen, and finishing operations such as trimming excess film are conducted.

While the present invention is particularly suited to preparing packages by vacuum skin packaging, the "wet look" is sometimes apparent in packages prepared by other methods, such as stretch packaging. Accordingly, the present invention will also be useful for such applications.

In addition to elimination of the "wet look," the films of the present invention exhibit improved slip and block properties compared to the unfilled films.

EXAMPLES 1-2 and COMPARATIVE EXAMPLES C1-C5

Blown 0.13 mm (5 mil) films of ethylene-methacrylic acid copolymer (unneutralized) were prepared containing various additives as indicated in Table I. The copolymer contained 9 percent by weight methacrylic acid and had a melt index of about 2 dg/min. The 20 degree gloss of film of the unfilled polymer was about 80 and the haze (ASTM D 1003-61) was about 1.5. (The additives were added by means of a concentrate of 20-25% silica in ethylene/9% methacrylic acid copolymer.) Films were prepared from the polymer melt at 230° C. Samples of two or three plastic marker (felt-tip) pens having a smooth surface were skin packed on an Ampak Shipmate II TM skin packaging machine, using the film indicated. The results in Table 1 show that synthetic amorphous silica is effective at reducing wet look, whereas other common siliceous fillers used as antiblock additives (diatomaceous earth or silica-alumina spheres) are not. Synthetic amorphous silica of larger particle size (15 micrometers) is more effective at reducing wet look than is silica of smaller particle size (6 micrometers).

TABLE I

| Ex. | Silica type[a] | % | APS[b], μm | Degree of "wet look"[c] | Optical Properties 20° Gloss | Total Haze |
|---|---|---|---|---|---|---|
| 1 | SAS | 2 | 6.0 | none/low | 7 | 44 |
| 2 | SAS | 1 | 15.0 | none | 30 | 15 |
| C1 | DE | 2 | 5.5 | high | 11 | 49 |
| C2 | DE | 2 | 6.8 | high | 10 | 46 |
| C3 | DE | 2 | 16.0 | medium/high | 10 | 39 |
| C4 | SiAl | 2 | 4.9 | high | 12 | 45 |
| C5 | SiAl | 2 | 18.9 | medium/high | 10 | 37 |

[a]SAS = synthetic amorphous silica  DE = diatomaceous earth  SiAl = silica-alumina spheres (Zeeosphere ™)
[b]average particle size
[c]qualitative evaluation, corresponding roughly to >50% of surface for "high," 30–40% for "medium" and <20% for "low."

EXAMPLES 4-7 and COMPARATIVE EXAMPLES C6-C8

Films were prepared by the same process as used in Example 1 using the resins indicated in Table II. The synthetic amorphous silica used was that of Example 2. For comparison, unfilled films were also examined. All films were evaluated as described for Example 1. The results in Table II show that the preferred silica can provide eliminate wet look in film made from a variety of high-gloss resins and that the effective amount of the preferred silica can be as low as 0.85% or less. Examples 4 and 5 show that the detrimental effects of filler on optical properties can be reduced by using lower levels of silica.

TABLE II

| Ex. | Polymer[a] | Silica % | Degree of "wet look" | Optical Properties 20° Gloss | Total Haze |
|---|---|---|---|---|---|
| C6 | ionomer | 0 | high | 110 | 1 |
| 4 | " | 0.85 | none | 26 | 13 |
| 5 | " | 1 | none | 13 | 21 |
| C7 | E/MAA | 0 | medium | 117 | 1 |
| 6 | " | 1 | none | 30 | 15 |
| C8 | EVA | 0 | medium | 102 | 2 |
| 7 | " | 1 | none | 19 | 18 |

[a]ionomer = copolymer of ethylene and 10 weight % methacrylic acid, 54% neutralized with sodium, melt index 1.3 dg/min. E/MAA = copolymer of ethylene and 9 weight % methacrylic acid, melt index 3 dg/min. EVA = copolymer of ethylene and 12 weight % vinyl acetate, melt index 0.35 dg/min.

COMPARATIVE EXAMPLES C9 and C10

For comparison unfilled films were prepared and tested as in Comparative Example C6, using, however, polymers which give inherently hazy films. The results in Table III show that "wet look" occurs even with comparatively hazy and non-glossy films. Thus the improvement in "wet look" by addition of synthetic amorphous silica, seen in Tables I and II, is not simply the result of reducing the optical properties of the film.

TABLE III

| Ex. | Polymer[a] | Degree of "wet look" | Optical Properties 20° Gloss | Total Haze |
|---|---|---|---|---|
| C9 | polyethylene | high | 22 | 15 |
| C10 | ionomer | high | 28 | 5 |

[a]polyethylene is a copolymer with 3.5 weight % vinyl acetate, melt index 0.5 dg/min. ionomer is a copolymer of ethylene with 15 weight % methacrylic acid, neutralized 58% with sodium, melt index 0.7 dg/min.

EXAMPLES 8-13

These examples show that the reduction of optical properties resulting from addition of filler can be minimized by using a multiple layer film in which the synthetic amorphous silica is present only in the layer which makes contact with the article to be packaged. Examples 8 and 9 are a monofilm, the same as Example 4 but containing 1.25 percent of the silica. Examples 10 and 11 are a 0.13 mm (5 mil) coextrusion comprising two layers based on the same polymer as in Example 4. Layer 1 was 0.102 mm (4 mils) thick and was unfilled. Layer 2 was 0.025 mm (1 mil) thick and was filled with 1.25 weight % of the same silica as in Example 8. Examples 12 and 13 show the effect of using progressively thinner layers confining the silica (at the same concentration). The optical properties are reported in Table IV. Thinner layers of filled polymer result in improvements in optical properties, particularly gloss as viewed from the unfilled side. The films of Example 9 and Example 11 were used to package marker pens, and were found to consistently eliminate "wet look." The film of Example 13, with the thinnest silica-containing layer, was likewise tested. The results from this film were variable, ranging from complete to no elimination of wet look. It is believed that an appropriate increase in filler concentration may be desired for consitently excellent results, if very thin layers of silica-filled polymer are used in demanding applications.

TABLE IV

| Ex. | Thickness (mm) (layers 1, 2) | Optical Properties 20° Gloss (side 1) | (side 2) | Total Haze |
|---|---|---|---|---|
| 8 | 1 layer, 0.127 | 29 | | 15 |
| 9 | 1 layer, 0.127 | 20 | | 18 |
| 10 | 0.102, 0.025 | 70 | 47 | 8 |
| 11 | 0.102, 0.025 | 69 | 52 | 9.1 |
| 12 | 0.108, 0.019 | 81 | 54 | 9.9 |
| 13 | 0.114, 0.013 | 89 | 57 | 9.2 |

EXAMPLES 14-19 and COMPARATIVE EXAMPLE C11

The effect of addition of relatively low levels of synthetic amorphous silica to the ionomer of Example 4 as one layer of a coextrusion was invenstigated. Each extrusion comprised a 0.102 mm (4 mil) layer of the ionomer of Example 4, filled with synthetic amorphous silica (from a 22.5% concentrate as in Example 1) in the amount indicated in Table V, and a 0.025 mm (1 mil) layer of unfilled polymer (either the ionomer or ethylene vinyl acetate copolymer, 8.9% vinyl acetate, melt index 2.0 dg/min, as indicated in Table V). Silica concentrations of 1% and above eliminated the wet look on packaged articles; lower concentrations did not completely eliminate the wet look. Optical properties, reported in Table V, of a film coextruded with a surface layer of unfilled ionomer were superior to those of a film with a surface layer of EVA. It should be noted that the 0.025 mm layer of unfilled resin was apparently too thin to fully provide the improvement in surface gloss obtainable with thicker layers.

TABLE V

| Ex. | Polymer | % Silica | % Haze | 20° Gloss inside/outside | % Clarity |
|---|---|---|---|---|---|
| C11 | ionomer | 0.0 | 1.2 | 109 | 54 |
| 14 | " | 0.75 | 8 | 46  43 | 0.5 |
| 15 | " | 1.0 | 14 | 27  32 | 0.5 |

TABLE V-continued

| Ex. | Polymer | % Silica | % Haze | 20° Gloss inside/outside | | % Clarity |
|---|---|---|---|---|---|---|
| 16 | " | 1.25 | 12 | 37 | 24 | 0.2 |
| 17 | EVA | 0.75 | 12 | 23 | 21 | 0.5 |
| 18 | " | 1.0 | 17 | 18 | 24 | 0.4 |
| 19 | " | 1.25 | 25 | 9 | 15 | 0.2 |

I claim:

1. A package comprising:
   (a) at least one article having a smooth surface, and
   (b) a substantially transparent film having at least one surface comprising
      (i) a polymer which in film form exhibits a specular gloss of at least about 20, measured at an angle of 20 degrees, and
      (ii) synthetic amorphous silica having particle size of about 0.5 to about 50 micrometers and being present in an amount sufficient to substantially prevent entrapment of air pockets between said surface of film and an adjacent smooth surface of said article,
   the silica-containing surface of said film being in contact with at least a part of the smooth surface of said article, wherein the polymer is a partially neutralized copolymer of ethylene with methacrylic acid.

2. A substantially transparent multiple layer film useful for packaging of an article with a smooth surface, said film having
   (a) at least one surface layer comprising:
      (i) a polymer which in film form exhibits a specular gloss of at least about 20, measured at an angle of 20 degrees; and
      (ii) synthetic amorphous silica having particle size of about 0.5 to about 50 micrometers and being present in an amount sufficient to substantially prevent entrapment of air pockets between said surface layer of film and an adjacent smooth surface of said article; and
   (b) at least one layer comprising unfilled polymer;
   wherein said surface layer is substantially free from fatty acid amides.

3. The film of claim 2 wherein the amount of synthetic amorphous silica in the surface layer is about 0.5 to about 3 weight percent.

4. The film of claim 2 wherein the amount of synthetic amorphous silica in the surface layer is about 0.75 to about 2.5 weight percent.

5. The film of claim 2 wherein the amount of synthetic amorphous silica in the surface layer is about 1 to about 2 weight percent.

6. The film of claim 2 wherein the synthetic amorphous silica has a particle size of about 3 to about 30 micrometers.

7. The film of claim 2 wherein the synthetic amorphous silica has a particle size of about 6 to about 15 micrometers.

8. The film of claim 2 wherein the polymer of the surface layer is selected from the group consisting of ethylene homo- and copolymers and flexible polyvinyl chloride.

9. The film of claim 2 wherein the polymer of the surface layer is selected from the group consisting of ethylene acid copolymers and ionomers thereof, ethylene vinyl acetate copolymer, and low density polyethylene.

10. The film of claim 2 wherein the polymer of the surface layer is a partially neutralized copolymer of ethylene with methacrylic acid.

11. The film of claim 2 wherein said surface layer contains less than about 0.02 percent fatty acid amide.

12. A process for packaging an article with a smooth surface, comprising
   (a) positioning the article adjacent to a substantially transparent film having at least one surface comprising
      (i) a polymer which in film form exhibits a specular gloss of at least about 20, measured at an angle of 20 degrees, and
      (ii) synthetic amorphous silica having particle size of about 0.5 to about 50 micrometers and being present in an amount sufficient to substantially prevent air entrapment between said surface of film and an adjacent smooth surface of said article, the silica-containing surface of said film facing the article,
   (b) bringing the film into contact with at least a portion of the smooth surface of the article, and
   (c) securing the film in its contacting configuration, wherein the film is a multilayer film, at least one layer of which is unfilled polymer and at least one surface layer of which contains synthetic amorphous silica.

* * * * *